3,135,766
3-SUBSTITUTED-3-PYRROLIDINOLS
William Andrew Gould, Evansville, Ind., assignor to Mead Johnson & Company, Evansville, Ind., a corporation of Indiana
No Drawing. Filed Oct. 3, 1961, Ser. No. 142,521
9 Claims. (Cl. 260—326.5)

This invention concerns compositions comprising 3-aryl-5-cycloaliphatic-3-pyrrolidinols of the following formula, the acid addition salts thereof, processes for production of these compositions, and their use in the treatment of certain disease conditions.

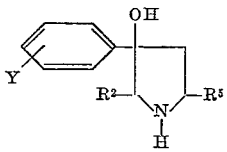

Formula I

In Formula I, Y is hydrogen, hydroxy, dihydroxy, halo, dihalo, alkyl, dialkyl, alkoxy, phenoxy, halophenoxy, phenyl, halophenyl, benzhydryloxy, trifluoromethyl, methylmercapto, isopropylidenedioxy, or a benzyloxy group of Formula II

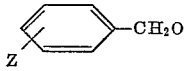

Formula II

In Formula II, Z is hydrogen, halo, dihalo, alkoxy, or alkyl.

$R^2$ of Formula I is either hydrogen or a lower aliphatic hydrocarbon group. $R^5$ is a cycloaliphatic hydrocarbon group having at least five carbon atoms, and preferably five, six, or seven carbon atoms. Examples of $R^5$ cycloaliphatic hydrocarbon groups include cyclopentyl, cyclopentenyl, cyclohexyl, cyclohexenyl, cycloheptyl, and cycloheptenyl. In Formulas I, II, and III the lower alkyl, alkoxy, and aliphatic hydrocarbon groups have a maximum of about four carbon atoms.

The compounds of the present invention have utility as therapeutic agents. They are characterized by a broad variety of pharmacological properties, including vasopressor-depressor effects, coronary dilator activity, peripheral vasodilator and vasoconstrictor activity, and papaverine-like smooth muscle depressant effects. These substances depress many types of mammalian smooth muscle, including the normal actions and spastic states thereof. They do not function by hormonal blocking action such as cholinergic or adrenergic blocking action, but have a direct effect on smooth muscle and have the property of relaxing such muscle in the spastic state, regardless of the agent or hormone responsible for the condition. They have uterine relaxant, bronchodilator, intestinal antispasmodic, coronary dilator, ureteral relaxant, and other useful effects on administration to mammalian hosts suffering from spastic conditions. They are characterized by low toxicities and particularly lack of effect on the central nervous system.

They may be administered by the oral or parenteral routes in doses ranging from 3 to 120 mg./kg. of body weight. Various types of pharmaceutical dosage formulations may be employed, including tablets, capsules, elixirs, solutions, suspensions, etc. The formulation may contain a compound of the present invention as the sole active ingredient or other active ingredients may be included to provide complementary pharmacological effects therewith.

The compounds of the present invention are prepared from the corresponding 1-acyl or 1-carbalkoxy-3-pyrrolidinols of Formula III in which Y, $R^2$, and $R^5$ have the meaning given above, and $R^1$ is a lower alkyl group or a lower alkoxy group.

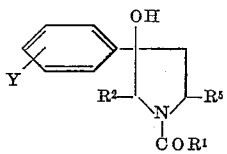

Formula II

These intermediates are prepared by the method described in copending application Serial Number 109,269, filed May 11, 1961, by Wu, Feldkamp, and Lobeck, now Patent No. 3,083,208. The preparation involves hydrolysis or alcoholysis of these intermediates in the presence of a strongly alkaline material such as sodium methoxide, potassium t-butoxide, sodium hydroxide, potassium hydroxide, or calcium oxide, alkoxide, or hydroxide. Strong acid conditions are usually to be avoided since dehydration with loss of the 3-hydroxyl group sometimes occurs. Furthermore, in some compounds of the present invention the 3-phenyl group bears a substituent which is sensitive to aqueous acid, for example the isopropylidenedioxy group.

In Formula III where the group Y represents the hydroxyl group the products may also be prepared by hydrogenolysis of the corresponding benzyloxy compounds in the presence of a hydrogenation catalyst such as finely divided platinum, palladium, nickel, rhodium, etc. under moderate conditions of temperature and pressure such as 1 to 5 atmospheres of hydrogen and room temperature up to about 50° C. The dihydroxy substances are prepared by dilute acid hydrolysis (e.g. 1–5% aqueous hydrochloric acid) of the corresponding isopropylidenedioxy compounds.

Where Y represents a substituted benzyloxy group including benzhydryl, the products may also be prepared by reaction of a corresponding 1-acyl or 1-carbalkoxy-3-(hydroxyphenyl)-3-pyrrolidinol with the desired benzyl halide (e.g. chloride, bromide, or iodide) in the presence of a strong base and a solvent for the reactants. Nearly any inert solvent that will dissolve appreciable quantities of each reactant and of the base employed may be used. The combination of anhydrous acetone and potassium carbonate has been found to be the most universally satisfactory. The base such as potassium carbonate must be sufficiently strong to neutralize the phenolic hydroxyl group participating in the process. Such bases are known to those skilled in the art, i.e. bicarbonates generally are too weak, while alkali metal carbonates and hydroxides are generally satisfactory. The 1-acyl or 1-carbalkoxy group is then removed as described above to yield the desired product.

The compounds of the present invention in which the group in the 5-position of the pyrrolidinol ring is a saturated group, that is the cyclopentyl, cyclohexyl, or cycloheptyl groups, may be prepared from the corresponding unsaturated compounds, the cyclopentenyl, cyclohexenyl, or cycloheptenyl compounds, by catalytic hydrogenation of the double bond. This is readily accomplished by low pressure hydrogenation, e.g. 45 p.s.i.g., over a platinum catalyst in a solvent such as methanol, ethanol, or acetic acid.

In the preparation of those compounds having an olefinic unsaturation in the 5-position cycloaliphatic substituent, that is the cyclopentenyl, cyclohexenyl, and cycloheptenyl-3-aryl-3-pyrrolidinols, and a hydroxyl or substituted benzyloxy group in the 3-phenyl substituent, which are ordinarily prepared by hydrogenolysis of a corresponding benzyloxy compound where a saturated 5-substituent is desired, the debenzylation step is preferably carried out by a chemical method such as debenzylation with sodium and butanol or sodium and liquid ammonia to avoid undesired hydrogenation of the 5-position unsaturated group. A convenient method for debenzylation of such benzyloxyphenyl pyrrolidinols has been described by Loev and Dawson in J. Am. Chem. Soc. 78, 6096 (1956). Their method involves treatment of a benzyloxyphenylalkene dissolved in anhydrous butanol with sodium, and is applicable in the present series for preparation of 5-cycloalkenyl-3-aryl-3-pyrrolidinol.

The acid addition salts of the present invention are prepared by reaction of pyrrolidinols with the appropriate acid. For example, the pyrrolidinol may be dissolved in ether or other suitable solvent and treated with the desired acid. Excesses of strong acids are to be avoided since dehydration of the pyrrolidinol with loss of the 3-hydroxyl group sometimes occurs. Pharmaceutically acceptable salts are of course contemplated for therapeutic purposes. They include the hydrobromides, hydrochlorides, hydroiodides, sulfates, phosphates, acetates, citrates, gluconates, succinates, tartrates, mucates, and benzoates, etc.

INTERMEDIATES

Intermediates necessary for preparation of compounds of this invention may be prepared by reacting a suitable 1-acyl or 1-carbalkoxy-3-pyrrolidinone with an appropriate Grignard reagent and hydrolyzing the resulting Grignard complex. Thus the generalized reaction for preparing these intermediates may be represented as follows:

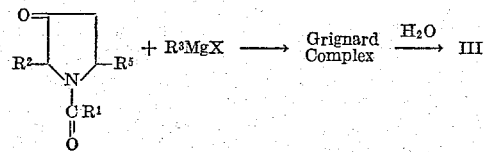

In the reaction indicated above, the values for $R^1$, $R^2$, and $R^5$ are the same as previously indicated. The formula $R^3MgX$ refers to the Grignard reagent, as is well known, wherein X is halogen, such as bromine, chlorine, or iodine, and $R^3$ corresponds to the aryl substituent it is desired to introduced into the 3-position. In carrying out the reaction, the usual conditions of operation are observed where a Grignard reagent is reacted with a compound having a carbonyl grouping to form the Grignard complex. Thus the reaction is effected under anhydrous conditions in the presence of an organic solvent, such as an ether or tetrahydrofuran. Although temperature is not particularly critical, reactions of this type are usually effected under reflux conditions. The complex is then hydrolyzed in the usual manner to form the corresponding alcohol.

The 1-carbalkoxy-3-pyrrolidinones that are reacted with the Grignard reagent to produce the above intermediates may be prepared by the method of Kuhn and Osswald, Chem. Ber. 89, 1423 (1956), which involves the reaction of N-carbethoxyglycine ethyl ester or other N-carbethoxy α-amino acid ester with an ester of α,β-unsaturated carboxylic acid in the presence of metallic sodium or other strong base and an inert solvent such as dry benzene. The corresponding 1,4-dicarbalkoxy-3-pyrrolidinone is formed and is then partially hydrolyzed and decarboxylated. The following reaction formulas illustrate the method:

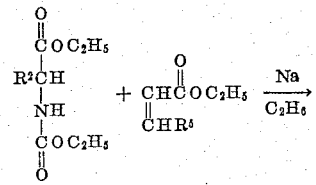

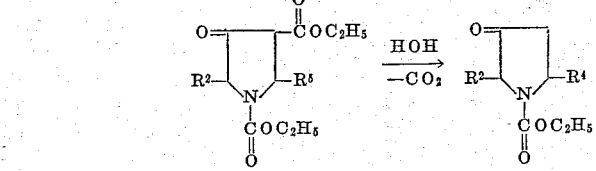

In order to produce the 1-acyl-3-pyrrolidinone starting materials, the Kuhn and Osswald method above indicated can be extended to the ethyl esters of some N-acyl-α-amino acids. Thus ethyl aceturate condenses with ethyl acrylate in the presence of sodium hydride and dry benzene. The resulting product is then partially hydrolyzed and decarboxylated to form the 1-acyl-3-pyrrolidinone. These 1-acyl-3-pyrrolidinones serve as intermediates for reaction with the aryl Grignard reagents in the same fashion as the 1-carbalkoxy-3-pyrrolidinones.

The 3-cycloalkyl and 3-cycloalkenyl substituted acrylic esters required in the Kuhn and Osswald synthesis of the 3-pyrrolidinones required for the present invention are prepared by the Doebner modification of the Knoevanagel reaction from the corresponding cycloalkyl or cycloalkenylcarboxaldehyde and malonic acid. The resulting substituted acrylic acid is then esterified in conventional fashion. Illustrations of these methods follow.

*Intermediate 1.—3-(3-Cyclohexenyl)Acrylic Acid*

3-cyclohexene-1-carboxaldehyde, 77.0 g. (0.07 mole), is added in a rapid dropwise fashion to a stirred mixture of 156 g. (1.5 mole) of malonic acid and 300 ml. of pyridine containing 5 ml. of piperidine. The mixture is then heated on a steam bath for 4½ hours, and kept at room temperature with stirring for an additional 24 hrs. The mixture is then poured into a large container containing 2 l. of crushed ice and 280 ml. of concentrated hydrochloric acid. A solid precipitates which is collected on a filter and washed with water, yield 132.0 g., M.P. 48–50.5° C. The acid obtained in this fashion is purified, first by dissolving in 420 ml. of 1 N aqueous sodium hydroxide, then extracting neutral impurities with ether, and reprecipitating the acid by treatment of the alkaline solution with 400 ml. of 1 N hydrochloric acid. The solid is again collected, washed with water, and dried, yielding 53.3 g. of 3-(3-cyclohexenyl)-acrylic acid, M.P. 51.0–52.5° C. This material is twice recrystallized from aqueous ethanol to give the analytically pure material, M.P. 51.5–53° C.

*Analysis.*—Calcd. for $C_9H_{12}O_2$: C, 71.02; H, 7.95. Found: C, 71.13; H, 8.07.

*Intermediate 2.—Ethyl 3-(3-Cyclohexenyl) Acrylate*

A solution of 1.0 mole of 3-(3-cyclohexenyl)acrylic acid, 50 ml. of ethanol, and 300 ml. of ethylene dichloride containing 3 ml. of concentrated sulfuric acid is stirred at the reflux temperature for 15 hours. The cooled mixture is then washed several times in a separatory funnel first with water, then aqueous sodium bicarbonate, and again with water. The ethylene dichloride solution is then dried over anhydrous magnesium sulfate, the drying agent filtered, and the solvent removed by distillation. The crude ethyl ester remaining is fractionated in vacuo, B.P. 130–135° C./15 mm. Hg; yield, 84%, $n_D^{25}$ 1.4851.

*Analysis.*—Calcd. for $C_{11}H_{16}O_2$: C, 73.30; H, 8.95. Found, C, 73.11; H, 8.88.

By application of methods given for Intermediates 1 and 2 above, the aldehydes listed in Table I are converted to the esters listed therewith.

TABLE I.—INTERMEDIATES

| | |
|---|---|
| Cyclohexanecarboxaldehyde | Ethyl 3-cyclohexylacrylate. |
| 1-cyclopentene-1-carboxaldehyde | Ethyl 3-(1-cyclopentenyl)-acrylate. |
| 2-cyclopentene-1-carboxaldehyde | Ethyl 3-(2-cyclopentenyl)-acrylate. |
| 3-cyclopentene-1-carboxaldehyde | Ethyl 3-(3-cyclopentenyl)-acrylate. |
| 1-cyclohexene-1-carboxaldehyde | Ethyl 3-(1-cyclohexenyl)-acrylate. |
| 1-cycloheptene-1-carboxaldehyde | Ethyl 3-(1-cycloheptenyl)-acrylate. |
| Cycloheptanecarboxaldehyde | Ethyl 3-(cycloheptyl)acrylate. |

Intermediate 3.—1,4-Dicarbethoxy-5-(3-Cyclohexenyl)-3-Pyrrolidinone

Ethyl N-carbethoxyglycine, 86.7 g. (0.5 mole), is added in dropwise fashion to a stirred suspension of 0.5 mole of sodium hydride in 500 ml. of anhydrous benzene at such a rate that the solvent gently refluxes. In order to assure formation of the sodium derivative of the ethyl N-carbethoxyglycine, the mixture is refluxed for 30 minutes after completion of ester addition. A solution of 0.5 mole of 3-(3-cyclohexenyl)acrylate in 100 ml. of anhydrous benzene is then added in dropwise fashion to the hot reaction mixture, and the mixture refluxed for 3 hrs. The contents of the flask are then cooled to room temperature and transferred to a separatory funnel and 167 ml. of 3 N hydrochloric acid is added thereto. The benzene layer is separated and the aqueous layer extracted several times with chloroform. The chloroform extracts are combined with the benzene solution and dried over anhydrous magnesium sulfate. The drying agent is removed, and the solvent distilled. The residue is fractionated in vacuo providing 1,4-dicarbethoxy-5-(3-cyclohexenyl)-3-pyrrolidinone, B.P. 135–140° C./0.5 mm. Hg $n_D^{26}$ 1.4910, yield 37%.

Intermediate 4.—1-Carbethoxy-5-(3-Cyclohexenyl)-3-Pyrrolidinone

A mixture of 0.2 mole of 1,4-dicarbethoxy-5-(3-cyclohexenyl)-3-pyrrolidinone in 200 ml. of water containing 2 ml. of concentrated hydrochloric acid is refluxed with stirring for 20 hours. The cooled mixture is then saturated with sodium chloride and extracted with ether. The ether extracts are dried over magnesium sulfate, the drying agent filtered, and the solvent removed by distillation. The residue is fractionated in vacuo, yielding the product, B.P. 132–142° C./0.15 mm. Hg $n_D^{24}$ 1.4954, yield 91%.

By application of the procedures given above for Intermediates 3 and 4 to the N-carbethoxy-α-amino acid esters listed in Table II, the 1-carbethoxy-5-(3-cyclohexenyl)-3-pyrrolidinones listed therewith are obtained.

TABLE II.—INTERMEDIATES

| | |
|---|---|
| Ethyl N-carbethoxyalanine | 1-carbethoxy-2-methyl-5-(3-cyclohexenyl)-3-pyrrolidinone. |
| Ethyl N-carbethoxy-α-aminobutyrate | 1-carbethoxy-2-ethyl-5-(3-cyclohexenyl)-3-pyrrolidinone. |
| Ethyl N-carbethoxy-α-aminopentanoate | 1-carbethoxy-2-(n-propyl)-5-(3-cyclohexenyl)-3-pyrrolidinone. |
| Ethyl N-carbethoxy-α-aminohexaneoate | 1-carbethoxy-2-(n-butyl)-5-(3-cyclohexenyl)-3-pyrrolidinone. |

By application of the methods used for Intermediates 3 and 4 to the 3-substituted ethyl acrylates listed in Table I, the pyrrolidinones listed in Table III are obtained.

TABLE III.—INTERMEDIATES 1-carbethoxy-5-cyclohexyl-3-pyrrolidinone
1-carbethoxy-5-(1-cyclopentenyl)-3-pyrrolidinone
1-carbethoxy-5-(2-cyclopentenyl)-3-pyrrolidinone
1carbethoxy-5-(3-cyclopentenyl)-3-pyrrolidinone
1-carbethoxy-5-(1-cyclohexenyl)-3-pyrrolidinone
1-carbethoxy-5-(1-cycloheptenyl)-3-pyrrolidinone
1-carbethoxy-5-cycloheptyl-3-pyrrolidinone

Intermediate 5.—1-Carbethoxy-3-Phenyl-5-(3-Cyclohexenyl)-3-Pyrrolidinol

A solution of 0.1 mole of 1-carbethoxy-5-(3-cyclohexenyl)-3-pyrrolidinone dissolved in 50 ml. of anhydrous ether, is added in dropwise fashion to 100 ml. of anhydrous ethereal solution of 0.15 mole of phenylmagnesium bromide prepared in conventional fashion from bromobenzene and magnesium turnings. After addition of the pyrrolidinone solution is completed, the reaction mixture is refluxed for 4 hrs. The mixture is then cooled to room temperature and poured into 400 g. of ice containing 20 g. of ammonium chloride. After thoroughly stirring the mixture to assure complete decomposition of the Grignard complex the ether layer is removed and the aqueous layer extracted seevral times with fresh portions of ether. The combined extracts and ether solution are dried over anhydrous magnesium sulfate, the drying agent removed by filtration, and the solvent distilled. The residue is fractionated in vacuo to yield 1-carbethoxy-3-phenyl-5-(3-cyclohexenyl)-3-pyrrolidinol, B.P. 165–168° C./0.3 mm. Hg, yield 48%.

Intermediate 6.—1-Carbethoxy-3-(4-Chlorophenyl)-5-(3-Cyclohexenyl)-3-Pyrrolidinol The procedure employed for Intermediate 5 is modified by substituting 4-chlorobromobenzene in preparation of the Grignard reagent for the bromobenzene specified for Intermediate 5. The desired substance is obtained in analagous fashion, B.P. 160–205° C./0.15 mm. Hg, yield 45%.

EXAMPLES

Example 1.—3-Phenyl-5-(3-Cyclohexenyl)-3-Pyrrolidinol

A mixture of 1 mole of 1-carbethoxy-3-phenyl-5-(3-cyclohexenyl)-3-pyrrolidinol in 50 ml. of n-propyl alcohol containing 25 g. of potassium hydroxide and 50 ml. of 10 N aqueous potassium hydroxide is stirred at the reflux temperature for 20 hrs. Upon cooling the alcoholic layer is separated and diluted to 400 ml. with isopropyl ether. The ethereal solution is then dried over anhydrous magnesium sulfate, the drying agent filtered and neutralized with ethanolic hydrogen chloride, resulting in precipitation of the hydrochloride salt of the desired product. 3-phenyl-5-(3-cyclohexenyl)-3-pyrrolidinol hydrochloride exhibits melting point 223–224° C. dec., and has the following composition as determined by standard microanalytical methods: C, 68.67%; H, 7.97%; and N, 5.02%. It exhibits infrared absorption maxima at the following wave lengths, 1025, 1100, 1490, 1600, 2780, 2880, 2920, 3050, 3300 cm.$^{-1}$ (potassium bromide pellet).

Example 2.—3-(4-Chlorophenyl)-5-(3-Cyclohexenyl)-3-Pyrrolidinol

The procedure of Example 1 is repeated, substituting as the starting material 1-carbethoxy-3-(4-chlorophenyl)-5-(3-cyclohexenyl)-3-pyrrolidinol. The product, 3-(4-chlorophenyl)-5-(3-cyclohexenyl)-3-pyrrolidinol hydrochloride, is recrystallized from ethanol-isopropyl ether yielding the purified product, M.P. 239–240° C. dec.; composition determined by microanalysis: C, 61.12%; Cl, 11.42%; H, 6.82%.

The compounds listed in Table IV are prepared by formation of the Grignard reagent from the halide listed and treatment thereof as described for Intermediate 5, to produce corresponding 1-carbethoxy-3-(substituted phenyl)-5-(3-cyclohexenyl)-3-pyrrolindinols which are hydrolyzed according to the method of Example 1.

TABLE IV.—PRODUCTS

| Product: | Halide |
|---|---|
| 3-(4-biphenylyl)-5-(3-cyclohexenyl)-3-pyrrolidinol | 4-bromobiphenyl. |
| 3-(4-benzyloxyphenyl)-5-(3-cyclohexenyl)-3-pyrrolidinol | 4-benzyloxybromobenzene. |
| 3-(4-methylthiophenyl)-5-(3-cyclohexenyl)-3-pyrrolidinol | 4-methylthiochlorobenzene. |
| 3-(3,4-isopropylidenedioxyphenyl)-5-(3-cyclohexenyl)-3-pyrrolidinol | 3,4-isopropylidenedioxybromobenzene. |
| 3-(4'-bromo-4-biphenylyl)-5-(3-cyclohexenyl)-3-pyrrolidinol | 4,4'-dibromobiphenyl. |
| 3-biphenylyl)-5-(3-cyclohexenyl)-3-pyrrolidinol | 3-bromobiphenyl. |
| 3-[4-(4-chlorophenoxy)phenyl]-5-(3-cyclohexenyl)-3-pyrrolidinol | 4,4'-dichlorodiphenyl ether. |
| 3-[4-(4-bromophenoxy)phenyl]-5-(3-cyclohexenyl)-3-pyrrolidinol | 4,4'-dibromodiphenyl ether. |
| 3-(4-bromophenyl)-5-(3-cyclohexenyl)-3-pyrrolidinol | 1,4-dibromobenzene. |
| 3-(4-fluorophenyl)-5-(3-cyclohexenyl)-3-pyrrolidinol | 4-fluorobromobenzene. |
| 3-(2-chlorophenyl)-5-(3-cyclohexenyl)-3-pyrrolidinol | 1,2-dichlorobenzene. |
| 3-(o-tolyl)-5-(3-cyclohexenyl)-3-pyrrolidinol | o-Bromotoluene. |
| 3-(2,5-dimethylphenyl)-5-(3-cyclohexenyl)-3-pyrrolidinol | o-Bromo-p-xylene. |
| 3-(p-tolyl)-5-(3-cyclohexenyl)-3-pyrrolidinol | p-Bromotoluene. |
| 3-(3-chlorophenyl)-5-(3-cyclohexenyl)-3-pyrrolidinol | m-Chlorobromobenzene. |
| 3-(3-methoxyphenyl)-5-(3-cyclohexenyl)-3-pyrrolidinol | o-Bromoanisole. |
| 3-(3-benzyloxyphenyl)-5-(3-cyclohexenyl)-3-pyrrolidinol | 3-benzyloxybromobenzene. |
| 3-(4-ethoxyphenyl)-5-(3-cyclohexenyl)-3-pyrrolidinol | p-Bromophenetol. |
| 3-(3,4-dichlorophenyl)-5-(3-cyclohexenyl)-3-pyrrolidinol | 3,4-dichlorobromobenzene. |
| 3-(4-phenoxyphenyl)-5-(3-cyclohexenyl)-3-pyrrolidinol | 4-bromodiphenyl ether. |
| 3-(3-trifluoromethylphenyl)-5-(3-cyclohexenyl)-3-pyrrolidinol | 3-trifluoromethylbromobenzene. |

The intermediates listed in Table III are allowed to react with phenyl magnesium bromide according to the procedure used for Intermediate 5, and the resulting 1-carbethoxy-3-phenyl-5-substituted-3-pyrrolidinol hydrolyzed by the method of Example 1 to yield the hydrochloride salts of the products listed in Table V.

TABLE V.—PRODUCTS 3-phenyl-5-cyclohexyl-3-pyrrolidinol
3-phenyl-5-(1-cyclopentenyl)-3-pyrrolidinol
3-phenyl-5-(2-cyclopentenyl)-3-pyrrolidinol
3-phenyl-5-(3-cyclopentenyl)-3-pyrrolidinol
3-phenyl-5-(1-cyclohexenyl)-3-pyrrolidinol
3-phenyl-5-(1-cycloheptenyl)-3-pyrrolidinol
3-phenyl-5-cycloheptyl-3-pyrrolidinol

Example 3.—3-Phenyl-5-Cyclohexyl-3-Pyrrolidinol Hydrochloride

A solution of 11.4 g. (0.036 mole) of 1-carbethoxy-3-phenyl-5-(3-cyclohexenyl)-3-pyrrolidinol in 100 ml. of ethanol is hydrogenated at 60 lb. p.s.i.g. and room temperature over 0.2 g. of platinum oxide. After 1 molecular proportion of hydrogen has been absorbed, manifested by the drop in pressure in the reaction vessel, the mixture is removed therefrom, the catalyst separated by filtration, and the solvent distilled in vacuo. The residue is fractionated in vacuo, yielding 1-carbethoxy-3-phenyl-5-cyclohexyl-3-pyrrolidinol as a viscous oil, boiling point 165–175° C./0.1 mm. Hg, which is hydrolyzed and converted to the hydrochloride salt as indicated in Example 1. The 3-phenyl-5-cyclohexyl-3-pyrrolidinol hydrochloride so obtained exhibits melting point 218–219° C. after recrystallization from ethanol-ether, and has the composition C, 68.00%; H, 8.46%; and N, 4.79%, as determined by standard microanalytical techniques. It exhibits infrared absorption maxima at the same wave lengths as the product of Example 1.

Example 4.—3-(4-Hydroxyphenyl)-5-(3-Cyclohexenyl)-3-Pyrrolidinol

Sodium, 5.89 g. (0.256 gram atom), is added rapidly but in small portions to a hot solution of 10 g. (0.0256 mole) of 3-(4-benzyloxyphenyl)-5-(3-cyclohexenyl)-3-pyrrolidinol (prepared as described above) in 80 ml. of anhydrous butanol. The solution is then allowed to cool to room temperature, and neutralized with 50% aqueous acetic acid, and washed with dilute aqueous sodium bicarbonate. The product is recovered from the butanol layer.

Example 5(a).—1-Carbethoxy-3-(4-Hydroxyphenyl)-5-Cyclohexyl-3-Pyrrolidinol

A mixture of 10.0 g. of 1-carbethoxy-3-(4-benzyloxyphenyl)-5-(3-cyclohexenyl)-3-pyrrolidinol in 200 ml. of 75% aqueous ethanol and 0.5 g. of platinum oxide is agitated in an atmosphere of hydrogen at 50 p.s.i.g. and room temperature until two molecular proportions of hydrogen have been absorbed. The catalyst is then removed by filtration and the filtrate concentrated to dryness at reduced pressure. The remaining residue is 1-carbethoxy-3-(4-hydroxyphenyl)-5-cyclohexyl-3-pyrrolidinol which serves as an intermediate for transformation as follows.

b.—3-[4-(4-Chlorobenzyloxy)Phenyl]-5-Cyclohexyl-3-Pyrrolidinol

A mixture of 4.4 g. (0.027 mole) of 4-chlorobenzyl chloride, 8.8 g. (0.027 mole) of 1-carbethoxy-3-(4-hydroxyphenyl)-5-cyclohexyl-3-pyrrolidinol (Example 5(a), 3.75 g. (0.027 mole) of anhydrous potassium carbonate and 10 ml. of dry acetone is refluxed with stirring for five hours. The mixture is then transferred to a separatory funnel and mixed with 200 ml. of water and 200 ml. of ether. The ether layer is separated, washed in turn with 50 ml. of 10% aqueous sodium hydroxide, and water, the ether distilled, and the residue hydrolyzed as in Example 1 to yield 3-[4-(4-chlorobenzyloxy)phenyl]-5-cyclohexyl-3-pyrrolidinol.

The substituted 5-cyclohexyl-3-(4-benzyloxyphenyl)-3-pyrrolidinols listed in Table VI are obtained as described in Example 5 from the benzyl halides listed.

TABLE VI.—PRODUCTS

| Product: | Halide |
|---|---|
| 3-[4-(2-chlorobenzyloxy)phenyl]-5-cyclohexyl-3-pyrrolidinol | 2-chlorobenzyl chloride. |
| 3-[4-(3,4-dichlorobenzyloxy)phenyl]-5-cyclohexyl-3-pyrrolidinol | 3,4-dichlorobenzyl chloride. |
| 3-[4-(4-methoxybenzyloxy)phenyl]-5-cyclohexyl-3-pyrrolidinol | 4-methoxybenzyl chloride. |
| 3-[4-(4-ethylbenzyloxy)phenyl]-5-cyclohexyl-3-pyrrolidinol | 4-ethylbenzyl chloride. |
| 3-[4-(4-fluorobenzyloxy)phenyl]-5-cyclohexyl-3-pyrrolidinol | 4-fluorobenzyl chloride. |
| 3-[4-(4-bromobenzyloxy)phenyl]-5-cyclohexyl-3-pyrrolidinol | 4-bromobenzyl bromide. |
| 3-(4-benzhydryloxyphenyl)-5-cyclohexyl-3-pyrrolidinol | Benzhydryl bromide. |

Example 6(a).—1-Carbethoxy-3-(3-Hydroxyphenyl)-5-(3-Cyclohexenyl)-3-Pyrrolidinol Sodium, 5.47 g. (0.238 gram atom), is added rapidly but in small portions to a hot solution of 10 g. (0.0238 mole) of 1-carbethoxy-3-(3-benzyloxyphenyl)-5-(3-cyclohexenyl)-3-pyrrolidinol in 80 ml. of anhydrous butanol. The solution is then allowed to cool to room temperature and is neutralized with 50% aqueous acetic acid. The butanol layer is then washed with dilute aqueous sodium bicarbonate, and the product recovered from the organic solvent solution.

(b).—3-[3-(4-Chlorobenzyloxy)Phenyl]-5-Cyclohexenyl-3-Pyrrolidinol

A mixture of 4.4 g. (0.027 mole) of 4-chlorobenzyl chloride, 8.8 g. (0.027 mole) of 1-carbethoxy-3-(3-hydroxyphenyl)-5-(3-cyclohexenyl)-3-pyrrolidinol (Example 6(a)), 3.75 g. (0.027 mole) of anhydrous potassium carbonate and 10 ml. of dry acetone is refluxed with stirring for five hours. The mixture is then transferred to a separatory funnel and mixed with 200 ml. of water and 200 ml. of ether. The ether layer is separated, washed in turn with 50 ml. of 10% aqueous sodium hydroxide, and water, the ether distilled, and the residue hydrolyzed as in Example 1 to yield 3-[3-(4-chlorobenzyloxy)phenyl]-5-(3-cyclohexenyl)-3-pyrrolidinol.

The substituted 5-(3-cyclohexenyl)-3-(3-benzyloxyphenyl)-3-pyrrolidinols listed in Table VII are obtained as described in Example 6 from the benzyl halides listed.

TABLE VII.—PRODUCTS

| Product: | Halide |
|---|---|
| 3-[3-(2-chlorobenzyloxy)phenyl]-5-(3-cyclohexenyl)-3-pyrrolidinol | 2-chlorobenzyl chloride. |
| 3-[3-(3,4-dichlorobenzyloxy)-phenyl]-5-(3-cyclohexenyl)-3-pyrrolidinol | 3,4-dichlorobenzyl chloride. |
| 3-[3-(4-methoxybenzyloxy)phenyl]-5-(3-cyclohexenyl)-3-pyrrolidinol | 4-methoxybenzyl chloride. |
| 3-[3-(4-ethylbenzyloxy)phenyl]-5-(3-cyclohexenyl)-3-pyrrolidinol | 4-ethylbenzyl chloride. |
| 3-[3-(4-fluorobenzyloxy)phenyl]-5-(3-cyclohexenyl)-3-pyrrolidinol | 4-fluorobenzyl chloride. |
| 3-[3-(4-bromobenzyloxy)phenyl]-5-(3-cyclohexenyl)-3-pyrrolidinol | 4-bromobenzyl bromide. |
| 3-(3-benzhydryloxyphenyl)-5-(3-cyclohexenyl)-3-pyrrolidinol | Benzhydryl bromide. |

*Example 7.—3-(3,4-Dihydroxyphenyl)-5-(3-Cyclohexenyl)-3-Pyrrolidinol*

One-tenth mole of 3-(3,4-isopropylidenedioxyphenyl)-5-(3-cyclohexenyl)-3-pyrrolidinol is dissolved in 50 ml. of 3% aqueous hydrochloric acid in a 250 ml. Erlenmeyer flask which is warmed in a water bath at 50° C. for 1.5 hours. The solution is then concentrated at room temperature in vacuo to effect complete removal of solvent, and the product is obtained as the residue which remains.

Compositions in dosage unit form containing the compounds of this invention may be prepared by conventional pharmaceutical methods. For this purpose both solid and liquid carriers, excipients, and diluents may be used along with suspending agents, stabilizers, preservatives, lubricants, etc., as desired. Examples of suitable carriers include corn starch, lactose, calcium phosphate, polyethylene glycol, water, sesame oil, peanut oil, propylene glycol, ethanol, etc. Dosage unit forms such as tablets or capsules for oral use and ampoules of solutions or suspensions for injection containing from 100 to 400 mg. of active ingredient are suitable.

The physician will determine the specific dosage form, size, and frequency for each individual patient. The range of suitable dosages has been stated above. Single doses of the order of 100 to 400 mg. are preferred. Specific examples of suitable dosage unit compositions are given below.

*Example 8.—Dosage Unit Composition*

Tablets containing 3-(4-chlorophenyl)-5-(3-cyclohexenyl)-3-pyrrolidinol hydrochloride are prepared as follows:

| Ingredients | Weight Per Tablet, mg. | Weight Per 100,000 Tablets, kg. |
|---|---|---|
| 3-(4-Chlorophenyl)-5-(3-cyclohexenyl)-3-pyrrolidinol hydrochloride | 200 | 20 |
| Calcium Phosphate, Dibasic | 100 | 10.0 |
| Lactose | 70 | 7.0 |
| Starch, Corn | 28 | 2.8 |
| Magnesium Stearate | 2 | 0.2 |
| Total Weight | 400 | 40.0 |

For a 100,000 tablet batch the above amounts of 3-(4-chlorophenyl)-5-(3-cyclohexenyl)-3-pyrrolidinol hydrochloride, calcium phosphate, lactose, and 2.2 kg. of the corn starch are dry blended and then wet granulated with 6 kg. of 10% aqueous corn starch paste. The resulting granulation is screened, dried, and rescreened. The granules are then coated with the magnesium stearate, which serves as a tableting lubricant, and the finished granules are compressed into tablets weighing 400 mg. each, using ordinary tableting equipment and methods.

*Example 9.—Dosage Unit Compositions*

A dry blend of the following ingredients is prepared:

| | Kg. |
|---|---|
| 3-phenyl-5-(3-cyclohexenyl)-3-pyrrolidinol hydrochloride | 20.0 |
| Lactose | 4.8 |
| Magnesium stearate | 0.2 |
| Total | 25.0 |

This mixture is then employed to fill No. 2 hard gelatin capsules, each with 250 mg. of the blend. If desired, the same blend may be filled into larger capsules each containing 500 mg. of the blend.

*Example 10.—Injectable Dosage Unit Composition*

3-phenyl-5-cyclohexyl-3-pyrrolidinol hydrochloride, 100 g., is dissolved in 9.5 l. of water for injection, U.S.P., containing 10% by weight of propylene glycol. The pH of the solution is adjusted to 5.7±0.1 using dilute aqueous sodium hydroxide or hydrochloric acid as required. The solution is then diluted to 10 l. with aqueous propylene glycol having the compositions indicated above, filtered sparkling clear, and 10 ml. portions thereof are filled into each of a group of ampoules made of Type I glass. The ampoules are sealed and sterilized by heating in an autoclave at 121° C. for 15 minutes.

While several particular embodiments of the invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of

[structure: pyrrolidinol with OH, Y substituent on phenyl, $R_2$, $R_5$, N-H]

and the pharmaceutically acceptable acid addition salts thereof wherein Y is selected from the group consisting of hydrogen, hydroxy, dihydroxy, halo, dihalo, lower alkyl, di-lower alkyl, lower alkoxy, phenoxy, halophenoxy, phenyl, halophenyl, benzhydryloxy, trifluoromethyl, methylmercapto, isopropylenedioxy, and

[structure: Z-substituted phenyl-$CH_2O$—]

wherein Z is selected from the group consisting of hydrogen, halo, dihalo, lower alkoxy and lower alkyl, each of said alkyl and alkoxy groups in Y and Z having up to four carbon atoms, $R_2$ is selected from the group consisting of hydrogen and lower alkyl having up to four carbon atoms, and $R_5$ is selected from the group consisting of cycloalkyl and cycloalkenyl having from five to seven carbon atoms.

2. A compound as claimed in claim 1 wherein Y and $R_2$ are hydrogen, and $R_5$ is a cycloalkyl group having six carbon atoms.

3. 3-phenyl-5-cyclohexyl-3-pyrrolidinol.

4. 3-phenyl-5-(3-cyclohexenyl)-3-pyrrolidinol.

5. A compound as claimed in claim 1 wherein Y is a chlorine atom, $R_2$ is hydrogen, and $R_5$ is a cycloalkyl group having six carbon atoms.

6. 3-(4-chlorophenyl)-5-cyclohexyl-3-pyrrolidinol.

7. 3 - (4 - chlorophenyl) - 5 - (3 - cyclohexenyl) - 3 - pyrrolidinol.

8. A compound as claimed in claim 1 wherein Y and $R_2$ are hydrogen and $R_5$ is a cycloalkenyl group having six carbon atoms.

9. A compound as claimed in claim 1, wherein Y is chlorine, $R_2$ is hydrogen, and $R_5$ is a cycloalkenyl group having six carbon atoms.

References Cited in the file of this patent

UNITED STATES PATENTS

| | | |
|---|---|---|
| 2,852,526 | Villani et al. | Sept. 16, 1958 |
| 2,864,825 | Heinzelman et al. | Dec. 16, 1958 |
| 2,890,985 | Marsh et al. | June 16, 1959 |
| 2,902,404 | Spencer | Sept. 1, 1959 |

OTHER REFERENCES

Wagner Zook: "Synthetic Organic Chemistry" (page 415) (1953), John Wiley and Sons, Inc.

UNITED STATES PATENT OFFICE
CERTIFICATE OF CORRECTION

Patent No. 3,135,766  June 2, 1964

William Andrew Gould

It is hereby certified that error appears in the above numbered patent requiring correction and that the said Letters Patent should read as corrected below.

Column 2, line 21, for "Formula II" read -- Formula III --; column 4, lines 11 to 18, for that portion of the formula reading:

$$\xrightarrow[C_2H_6]{Na} \quad \text{read} \quad \xrightarrow[C_6H_6]{Na}$$

column 6, line 5, for "1carbethoxy" read -- 1-carbethoxy --; line 74, for "3-pyrrolindinols" read -- 3-pyrrolidinols --.

Signed and sealed this 10th day of November 1964.

(SEAL)
Attest:

ERNEST W. SWIDER
Attesting Officer

EDWARD J. BRENNER
Commissioner of Patents